(No Model.) 2 Sheets—Sheet 1.
F. G. SARGENT.
WOOL WASHING MACHINE.
No. 433,582. Patented Aug. 5, 1890.
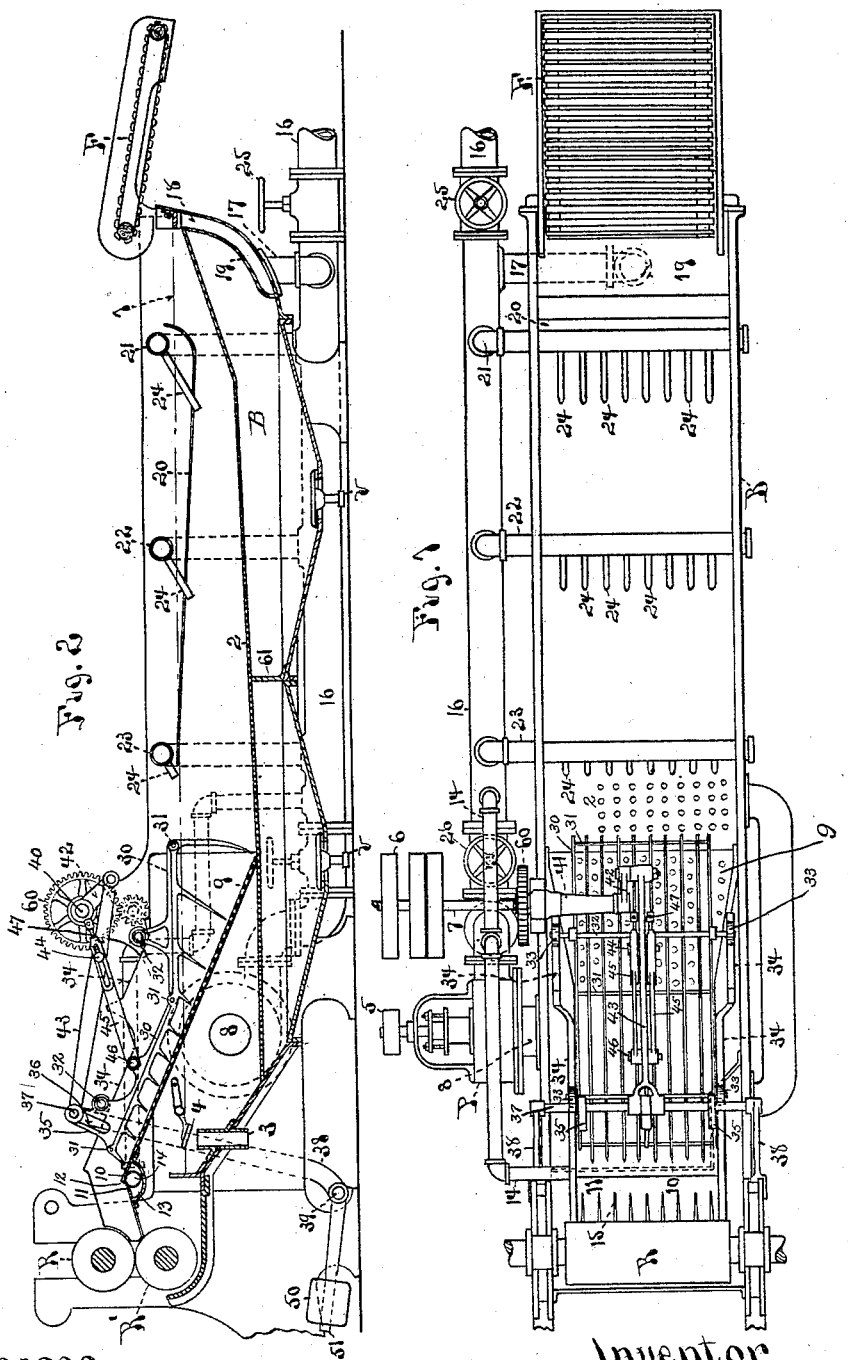
Witnesses
N. P. Ockington.
C. J. Poland.
Inventor
Frederick G. Sargent
By David H. Rice
Atty.

(No Model.) 2 Sheets—Sheet 2.

F. G. SARGENT.
WOOL WASHING MACHINE.

No. 433,582. Patented Aug. 5, 1890.

Witnesses
N. P. Ockington
O. J. Poland

Inventor
Frederick G. Sargent
By David Hall Rice
Atty

UNITED STATES PATENT OFFICE.

FREDERICK G. SARGENT, OF GRANITEVILLE, MASSACHUSETTS.

WOOL-WASHING MACHINE.

SPECIFICATION forming part of Letters Patent No. 433,582, dated August 5, 1890.

Application filed March 25, 1889. Serial No. 304,658. (No model.)

*To all whom it may concern:*

Be it known that I, FREDERICK G. SARGENT, of Graniteville, in the county of Middlesex and State of Massachusetts, have invented a certain new and useful Improvement in Wool-Washing Machines, of which the following is a specification.

My invention relates to machines for washing wool and similar fibers; and it consists in certain new and useful constructions and combinations of the several parts thereof, substantially as hereinafter described and claimed.

Figure 3:
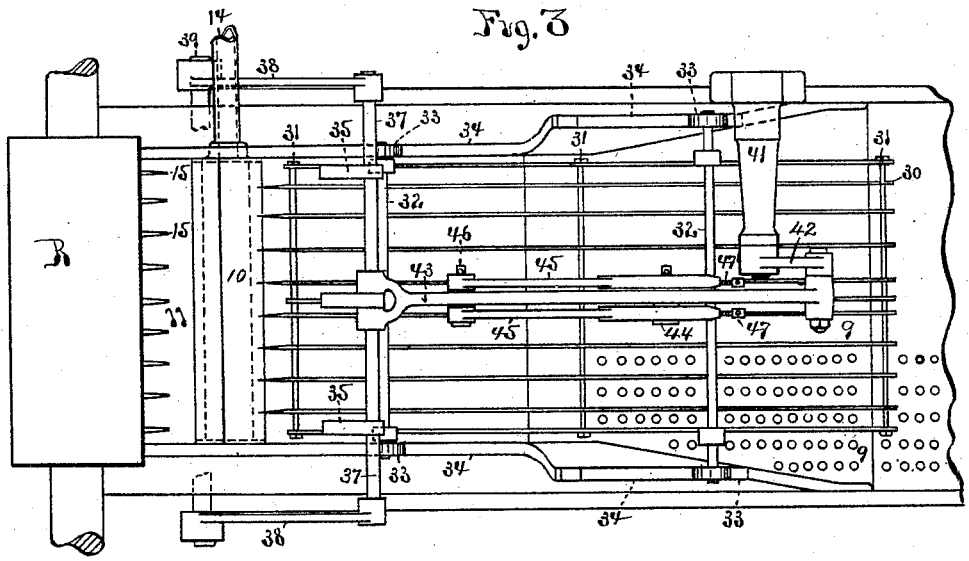
Figure 4:
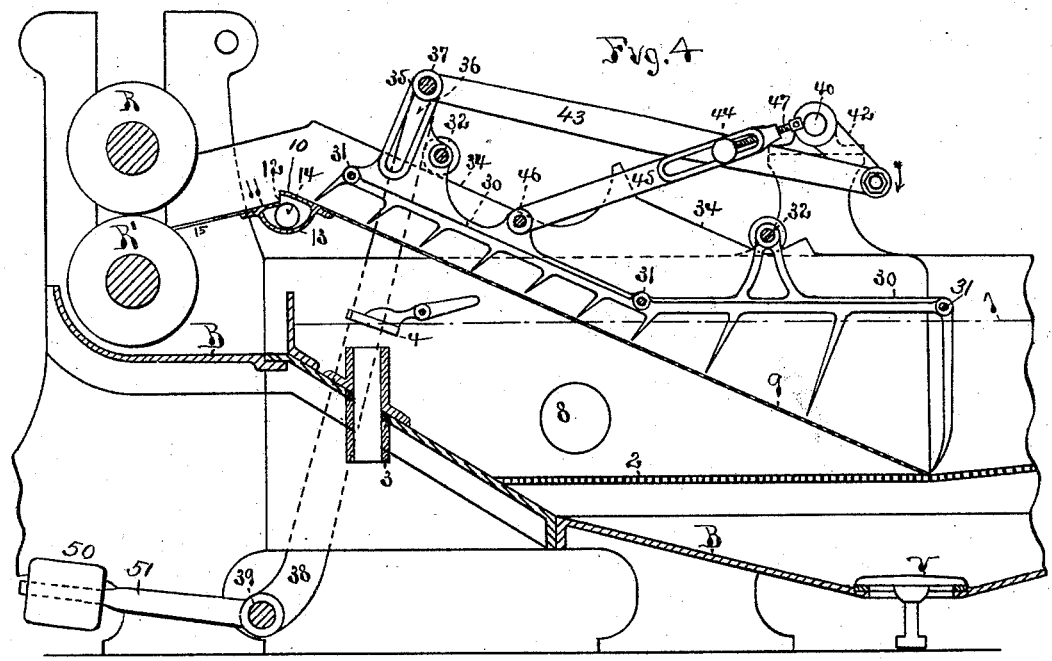

In the drawings, Figure 1 is a top plan view of a wool-washing machine provided with my improvements. Fig. 2 is a longitudinal vertical section of the same near the center of the bowl. Fig. 3 is a portion of Fig 1 enlarged to show the construction and operation of the parts more clearly. Fig. 4 is a like enlargement of the same parts of Fig. 2.

B is the bowl of the machine, in which the washing-liquor is expected to stand at about the height of the dotted line 1. It is provided with a feed-in apron F at one end and squeeze-rolls R R' at the other end, which express the liquid from the wool as they deliver it from the bowl. This feed-in apron and these rolls are driven by pulleys on the ends of their roll-shafts, which are not shown for the sake of clearness, and need no further description, as their mode of operation is well understood. Within the bowl its bottom is inclined or pitched down toward the valves *v v*, which are used to draw off the fluid from the bowl after the washing is completed and to wash out the accumulated dirt and impurities. Above this bottom of the bowl is placed the false perforated bottom 2, which serves to allow the dirt or impurities to fall through it and sink to the bottom of the bowl as they are washed from the wool. This false bottom 2 extends the whole length of the bowl underneath the carrier-bed until it meets the upwardly-inclined bottom of the bowl, and the fluid flowing through the carrier-bed, as hereinafter described, is separated by the false bottom from the dirt which has settled beneath the latter, and prevented by it from sucking the dirt into the outflow-pipe and delivering it again upon the fiber. An overflow-discharge pipe 3 is located near the squeeze-roll end of the bowl, extending through its bottom, and is provided with a valve or cover 4, which may be used to close it when desired. The upper end of this overflow-pipe is above the false bottom 2 and beneath the carrier-bed, and fluid flowing out through it will flow toward it through the carrier-bed without disturbing the dirt which has settled under the false bottom.

A rotary pump P is attached to one side of the bowl, and operated by the pulley 5 on its shaft, which is belted to the pulley 6 on the driving-shaft 7. This pump has an inlet-pipe 8 leading from the inside of the bowl below the inclined carrier-bed 9, and above the false bottom 2. This carrier-bed is formed of a perforated sheet of metal or wood inclined upward from the false bottom 2 to a point above the water-level and above the lower squeeze-roll R', where it is attached to a shelf 10. Another shelf 11 inclines downward from near the upper end of shelf 10 to the lower squeeze-roll, so as to leave a space or opening 12 between the upper edge of shelf 11 and the lower edge of shelf 10, and a trough 13 is secured to the lower sides of the shelves 10 and 11, so as to form, in conjunction with them, a long pipe extending transversely the whole width of the machine, and having its discharge-opening through the slot 12. A supply or inlet pipe 14 furnishes the liquid from the pump into the trough 13, thus causing a sheet of washing-fluid to be projected through the slot 12 over the surface of plate 11 toward the squeeze-rolls, and carrying the wool downward toward the latter. Near the squeeze-rolls the plate 11 is provided with slots 15 15 for the escape of the washing-fluid downward just before the wool enters between the squeeze-rolls. The fluid escaping through the slots 15 descends into a supplemental part of the bowl B.

From the pump P a pipe 16 leads alongside of the bowl B nearly its entire length, and the pipe 14 is connected to this. A branch pipe 17 connects the pipe 16 to a trough 18, which is partitioned off at the feed-in end of the bowl by the wall 19, upon the upper edge of which this end of the false bottom 2 is joined, so that the washing-fluid forced into the trough 18 shall overflow the upper edge of the wall 19 and run in a continuous sheet along over the false bottom 2. A curved shield 20 extends across the bowl from side to side, slightly below the water-line from this end, in such a position that the feed-apron F will deliver the wool in advance of it into the bowl, and the fluid overflowing from the trough 18 toward the other end of the bowl will continually carry the wool under this shield and complete its submergence in the washing-fluid.

From the pipe 16 the pipes 21, 22, and 23 extend upward and across the bowl above the shield 20, being closed at their opposite ends. Each of these pipes has a series of short jet-pipes 24 extending downward below the surface of the shield 20 and through the latter, and inclined toward the squeeze-roll end of the bowl. The pipe 16 has a valve 25 beyond the feed-in end of the bowl, by which it can be closed at that point, and it has another valve 26, by which it can be shut off between its connection with the pipe 14 and the pump.

When the bowl is filled with washing-fluid and the pump is set in motion, it continually draws the fluid through the pipe 8 from beneath the carrier-bed 9, and discharges it through the trough 18 and the pipes 21 22 23 and their jet-pipes 24 in the direction of the carrier-bed with considerable force, and thus causes a flow of the washing-fluid continuously in that direction, carrying the wool forward over the false bottom 2 and subjecting it to the rinsing and soaking action of the jets of fluid on the way and lodging it upon the carrier-bed, where it is taken up by the carrier. The suction of the washing-fluid, which passes on through the perforations of the carrier-bed, leaving the wool behind it on the latter, tends to distribute the wool evenly on the lower part of the bed, which is exposed when the carrier moves upward, because as soon as any one perforation is covered by the wool the succeeding current flows through other perforations yet uncovered and deposits the wool carried by it there. The suction of the fluid passing through the perforations also serves to hold the wool in this position while the carrier is returning downward, to take it up on the next upward movement, when the carrier strips the bed of its adhering wool and leaves it exposed, ready to collect another deposit before the carrier returns for it. In thus alternately clearing off the bed and leaving it exposed for a fresh deposit of wool to adhere thereto, by the suction of the flow of the fluid through the perforations, it is desirable that the flow of the washing-fluid shall not be so great as to lodge more wool against the bed than the perforations will retain in position; but even in this event the average distribution of the fiber over the bed will be superior to ordinary constructions of the bed and carrier with no suction. This carrier has some peculiarities of construction which adapt it to take up the wool both when floating in the fluid over the carrier-bed and when lodged upon the latter, which I will now describe. It is formed of a series of bars 30, rigid from end to end longitudinally of the machine and held together by cross-rods 31. In lugs upon its upper side are secured cross-rods 32, carrying upon their outer ends rollers 33, which in the upward motion of the carrier rest upon the inclined ways 34 34, formed on the edges of the bowl, so as to carry the carrier up parallel with the carrier-bed. In the lugs 35 35 on the upper end of the carrier are formed slots 36, through which passes the rod 37, having its ends firmly secured in the swinging links 38, which are pivoted to the cross-bar 39 below the bowl of the machine. The slots 36 are formed at nearly right angles to the bed of the carrier. A crank-shaft 40 passes through the pipe-sleeve 41, which is attached to the side of the bowl and has attached to its outer end the crank 42. A pitman 43 connects this crank to the rod 37, so that as the crank revolves the carrier will be moved back and forth over the carrier-bed; but since the ways 34 34 guide the carrier parallel to the carrier-bed it is necessary that it should be lifted from these ways in its backward motion, which I accomplish as follows: Through the pitman 43 extends a bolt or shaft 44 horizontally, which projects for some distance beyond each face of the pitman, and has an enlarged head or end on each outer end. A double link 45 45 is attached by a pivot 46 to the upper side of the carrier, and has longitudinal slots in its upper ends embracing the neck or body part of the bolt 44 on each side of the pitman 43, the enlargement or head of the bolt serving the purpose of keeping each part of the link in place on the bolt. Through the upper ends of the double link set-screws 47 47 pass longitudinally of the link into the slots and bear upon the bolt 44, so as to shorten or lengthen the amount of play which the bolt 44 has in the slots of the link. These set-screws are so placed that when the crank 42 has pushed the carrier up on its inclined ways it shall not begin to lift upward or pull on the link 45 until the carrier has completed its traverse up the inclines. The pivot 46, by which the link 45 is attached to the carrier, is so placed that the larger proportion of the weight of the carrier will be below this pivot, and the operation of the mechanism is as follows: When the revolution of the crank 42 has pushed the carrier as far as possible up the inclined ways, the continued revolution of the crank in the direction of the arrow, Fig. 4, brings the bolt 44 against the ends of the set-screws 47 and begins to lift on the carrier. As, however, the lighter end of the carrier is above the pivot 46, this lifting will be in the first instance entirely upon the front end of the carrier until the lower sides of the slots 36 in the lugs 35 have been raised so as to come in contact with the rod 37, when the continuous lifting on the link 45 will raise up the back end of the carrier very rapidly. The parts are so proportioned that all this lifting is substantially done while the crank is in the first part of its backward motion with relation to the carrier-bed, and therefore the carrier thus lifted bodily above the washing-fluid is dropped down into it while the crank is making its descending motion and before it has begun its forward motion, substantially as shown in Fig. 4, the dropping of the carrier being of the rear end first and of the other parts of it successively toward the front end, thus preventing any swirl of the fluid from carrying the wool backward by dropping the forward part of the carrier first, or less than the rear part. The wool is therefore caught effectively, whether floating in the fluid above the carrier-bed or lodged upon the lower end of the latter, and carried upward at each stroke of the carrier without creating any currents which shall tend to wash the fiber off the carrier-bed after it has been partially carried up by one stroke of the carrier, and before it is taken another stage in its upward progress by the next stroke. This is due to the fact that the rear end of the carrier remains down and holding the wool down in position upon the bed until the other parts are lifted preparatory to its backward motion.

The arms 38 have a counter-weight 50, mounted upon an arm 51, attached to their cross-shaft 39, Fig. 2, which balances the weight and pull of the carrier downward upon the ways and prevents undue strain upon the working parts.

The end of the pipe 16 which projects beyond the feed-in end of the bowl is designed to be connected to an exterior source of pure water-supply having a head or pressure of water. When it is desired to use the machine for rinsing the wool after its washing is completed, the washing-fluid is drawn off, the pump P stopped, and the overflow-pipe 3 opened. The valve 26 is then closed and the valve 25 opened, and the rinsing-water allowed to flow from its exterior source through the pipe 16, trough 18, and branch pipes 21, 22, 23, and 14, and out through the overflow 3, when the wool is again put through the rinsing-water thus supplied, which carries it by its currents through the machine in the same way as the action of the pump did while washing the wool, and the rinsing-water is thus discharged out of the machine as fast as used, as it cannot be used over, as the washing-fluid is in washing the wool.

The crank-shaft 40 is driven by the gear-wheel 60 on its outer end, which in turn is driven by a pinion on the inner end of the driving-shaft 7.

Under the false bottom 2 of the bowl B a transverse partition 61 is secured to the latter, so as to fill the space underneath the false bottom entirely. This partition prevents the currents of the washing-liquid from traversing the space beneath the false bottom, as the transverse partition is located between the feed-in end of the bowl and the carrier.

The space beneath the false bottom is thereby best adapted to receive and retain dirt without having it carried forward in the bowl and mingled with the wool fibers near its feed-out end.

What I claim as new and of my invention is—

1. In a machine for washing fiber, the combination of the bowl B, the squeeze-rolls R R' at its delivery end, the inclined perforated carrier-bed extending from below the fluid-level upward to said squeeze-rolls and arranged to deliver the fiber moved along its upper surface properly thereto, the reciprocating carrier arranged to move the fiber along upon said bed to said squeeze-rolls, a pipe leading from beneath the inclined perforated carrier-bed and forming a fluid-outlet thereunder, and a fluid-supply pipe arranged to deliver fluid to the bowl on the feed-in side of said perforated carrier-bed and carrier, whereby the suction of the fluid flowing through the perforations of said carrier-bed from said supply-pipe to said outlet-pipe is made to distribute the fiber evenly over it, and retain it there during the return movements of the carrier, substantially as described.

2. In a machine for washing fiber, the combination of the bowl B, the squeeze-rolls R R' at its delivery end, the reciprocating carrier and its inclined perforated bed arranged beneath it to convey the fiber from the bowl to said squeeze-rolls, a series of delivery-pipes 24, mounted upon the bowl and arranged to deliver fluid into the same and to project it through the bowl toward the carrier-bed, and pipes 16 and 21, connected thereto and adapted to be connected to an outside water-supply and to convey the same to said series of delivery-pipes, substantially as described.

3. In a machine for washing fiber, the combination of the bowl B, the squeeze-rolls R R' at the delivery end thereof, the reciprocating carrier and its inclined perforated bed arranged beneath it to convey the fiber from the bowl to said squeeze-rolls, the overflow-pipe 3, a series of delivery-pipes 24, mounted upon the bowl and arranged to deliver fluid into the same and project it through the bowl toward the carrier-bed, the pump P, connected to the squeeze-roll end of the bowl by pipe 8, and the pipes 16 21, connecting said pump to the said series of delivery-pipes and adapted to be connected to an outside source of fluid-supply and provided with the valves 25 and 26, whereby the said pump may be shut off from said series of delivery-pipes and said outside fluid-supply let on, or vice versa, substantially as described.

4. In a machine for washing fiber, the combination of the bowl B, the squeeze-rolls R R' at its delivery end, the inclined perforated carrier-bed extending from below the fluid-level upward to said squeeze-rolls and arranged to deliver the fiber moved along its upper surface properly thereto, the reciprocating carrier arranged to move the fiber along upon said bed to said squeeze-rolls, the pipe 8 leading from beneath the inclined perforated carrier-bed, the pump connected thereto, and the fluid-supply pipe 16 leading therefrom and having a discharge-outlet into the bowl on the feed-in side of said carrier and its perforated bed, whereby the suction of the fluid flowing through the perforations thereof, when drawn from beneath said bed and delivered into the bowl on the opposite side thereof, is made to distribute the fiber evenly over it and retain it there during the return movements of the carrier, substantially as described.

5. In a machine for washing fiber, the combination of the bowl B, the squeeze-rolls R R' at its delivery end, the inclined perforated carrier-bed extending from below the fluid-level upward to said squeeze-rolls and arranged to deliver the fiber moved along its upper surface properly thereto, the reciprocating carrier arranged to move the fiber along upon said bed to said squeeze-rolls, the pipe 8 leading from beneath the inclined perforated carrier-bed, the pump connected thereto, a series of delivery-pipes 24 mounted upon the bowl and arranged to deliver fluid into the same and project it through the bowl toward the carrier-bed, and pipes connecting the same to said pump, whereby the projected fluid flowing through the perforations of the carrier-bed to the outlet-pipe is made to distribute the fiber evenly over it and retain it there during the return movement of the carrier, substantially as described.

6. In a machine for washing fiber, the combination of the bowl B, the squeeze-rolls mounted at the delivery end thereof, the reciprocating carrier, the carrier-bed formed of the double inclined plates 9, 10, and 11, a fluid-supply conduit beneath the angle formed thereby, provided with a discharge-opening 12, arranged to project a sheet of fluid over the plate 11 toward the squeeze-rolls, and a pipe connecting the same with a source of fluid-supply, substantially as described.

7. In a machine for washing fiber, the combination of the bowl B, the squeeze-rolls R R' at the delivery end thereof, the inclined carrier-bed, and the carrier moving on ways and provided with the slotted lugs 35 at its forward end, the rod 37 moving therewith, the pitman 43, the crank 42 connected thereto, and the link 45, attached at one end to said pitman and at the other end to said carrier above its longitudinal center of gravity, whereby the said carrier is lifted at its rear end last and dropped rear end first by the action of the crank, substantially as described.

8. The combination of the bowl B, its perforated false bottom 2, having one end of it extending under the carrier-bed to the bottom of the bowl, the transverse partition 61 beneath the false bottom, a supply-pipe, arranged to supply fluid at the feed-in end of the bowl, the inclined perforated carrier-bed arranged to have the fiber moved along its upper surface up out of the fluid, the reciprocating carrier acting in conjunction therewith, and an outlet-pipe beneath the carrier-bed and above the false bottom 2 at the feed-out end of the bowl, substantially as described.

FREDERICK G. SARGENT.

Witnesses:
ARTHUR B. PLIMPTON,
HERBERT V. HILDRETH.